United States Patent

Scheckenbach

[11] Patent Number: 6,100,327
[45] Date of Patent: Aug. 8, 2000

[54] ABRASION-RESISTANT SYSTEMS

[75] Inventor: Helmut Scheckenbach, Langen, Germany

[73] Assignee: Ticona GmbH, Germany

[21] Appl. No.: 09/174,141

[22] Filed: Oct. 16, 1998

[30] Foreign Application Priority Data

Oct. 17, 1997 [DE] Germany ............... 197 45 667

[51] Int. Cl.$^7$ ................................................. C08L 81/00
[52] U.S. Cl. ......................................................... 524/609
[58] Field of Search .............................. 525/100; 524/609

[56] References Cited

U.S. PATENT DOCUMENTS

| | | | |
|---|---|---|---|
| 3,684,763 | 8/1972 | Frazier | 260/37 |
| 3,948,865 | 4/1976 | Brady et al. | |
| 4,882,415 | 11/1989 | Hunziker | 528/374 |
| 5,496,917 | 3/1996 | Fleischer | 528/373 |
| 5,708,089 | 1/1998 | Scheckenbach | 525/189 |
| 5,891,988 | 4/1999 | Scheckenbach | 528/373 |
| 5,907,029 | 5/1999 | Disch | 528/373 |

OTHER PUBLICATIONS

Sugama T., et al: "The Protection OFD Aluminium Alloys in Harsh, Corrosive Environments By Oxidized Polyphenylene Sulphide Coatings" Polymers and Polymer Composites, Bd. 3, No. 4, Jan. 1, 1995.

*Primary Examiner*—Paul R. Michl
*Attorney, Agent, or Firm*—Connolly Bove Lodge & Hutz

[57] ABSTRACT

Polymeric coating systems comprising an oxidized polyarylene sulfide, especially polyarylene sulfone or partially oxidized polyarylene sulfide, are of improved abrasion resistance. The coating systems preferably comprise a polymer, a binder resin and oxidized polyarylene sulfide, and are suspended in a liquid vehicle. The coating systems are used for coating the surface of metallic and nonmetallic substrates.

9 Claims, No Drawings

ABRASION-RESISTANT SYSTEMS

The invention relates to polymeric coating systems which in order to improve their abrasion resistance comprise oxidized polyarylene sulfides, especially polyarylene sulfones or partially oxidized polyarylene sulfides containing not only $SO_2$ but also SO and/or S bridges, and to their use for producing coated moldings. All of the oxidized polyarylene sulfides in the context of this invention are infusible.

Oxidized polyarylene sulfides for improving the abrasion resistance of polymers are known (DE 43 23 181, DE 43 23 121, DE 196 13 979 A1 and DE 197 09 035 A1). Their use for coating systems, however, is not mentioned in these application documents.

Since coating systems are fundamentally different in their behavior from moldings, it is not possible automatically to conclude that abrasion resistance will be improved in the case of coating systems.

Polymeric fillers, examples being polyphenylene sulfide (PPS), polyether sulfone (PES) or polyamidimide (PAI), for polymeric coating systems are known (DE 28 00 609, DE 24 62 863). The function of these polymeric fillers is primarily, however, not to improve the abrasion behavior but instead principally to improve the adhesion of the coating system to its substrate. In order to achieve this the abovementioned polymeric fillers melt during the coating operation and in so doing enter into a solid bond with the substrate, thus ensuring good adhesion between substrate and coating system. These polymeric fillers are also referred to as binder resins.

Oxidized polyarylene sulfides, especially polyarylene sulfones, however, do not melt during the coating operation but instead retain their particulate form and lead to an increased abrasion resistance of the coating system.

It has been found that the addition of oxidized polyarylene sulfides, especially of polyarylene sulfones, to polymeric coating systems increases their abrasion resistance. This is surprising since other polymeric additives, such as the binder resins, show little such improvement in this property.

The invention therefore provides polymeric coating systems consisting of a liquid vehicle and of a polymer mixture which comprises at least on oxidized polyarylene sulfide, and also provides for their use for producing coated moldings.

The polymer mixture of the coating system generally comprises at least one polymer in a proportion of from 1.5 to 99.5% by weight, at least one binder resin in a proportion of from 0 to 98% by weight and at least one oxidized polyarylene sulfide in a proportion of from 0.5 to 60% by weight. The proportion of the overall weight of the coating system that is accounted for by the liquid vehicle is from 1 to 99% by weight.

Polymers are well known and are described, for example, in Ullmann's Encyclopedia of Industrial Chemistry, VCH Verlagsgesellschaft mbH, Weinheim-N.Y., to which reference is hereby made. They include, for example, organic fluoropolymers, Volume A11, pp. 393–430; polyacrylamides and polyacrylic acids, Volume A21, pp. 143–156; polyacrylates, Volume A21, pp. 157–178; polyamides, Volume A21, pp. 179–206; polycarbonates, Volume A21, pp.207–216; polyesters, Volume A21, pp. 227–252; polyimides, Volume A21, pp. 253–273; polymer blends, Volume A21, pp. 274–305; electrically conductive polymers, Volume A21, pp. 429–448; high-temperature-resistant polymers, Volume A21, pp. 449–472; polymethyl methacrylates, Volume A21, pp. 473–486; polyolefins, Volume A21, pp. 487–578; polyoxyalkylenes, Volume A21, pp. 579–590; polyoxymethylenes, Volume A21, pp. 591–604; polyphenylene oxides, Volume A21, pp. 605–614; polystyrenes and styrene copolymers, Volume A21, pp. 615–664; polyurethanes, Volume A21, pp. 665–716; polyvinyl chlorides, Volume A21, pp.717–742; polyvinyl compounds, Volume A21, pp. 743–758; polyvinyl esters, Volume A22, pp. 1–10; polyvinyl ethers, Volume A22, pp. 11–16; polyvinylidene chlorides, Volume A22, pp. 17–30 and silicones, Volume A24, pp. 57–94. The term polymers also includes mixtures or blends of polymers. Polymers also include thermosets and elastomers.

Preference is given to organic fluoropolymers and silicones, with organic fluoropolymers being particularly preferred.

Binder resins are polymers which melt during the procedure of baking the coating systems and which ensure good adhesion between the polymer and the substrate to be coated. Where fluoropolymers are employed as polymers for coating systems, examples of typical binder resins are polyphenylene sulfides, polyaryl ether ketones, polyamideimides, polyimides and polyether sulfones.

Oxidized polyarylene sulfides are linear and/or branched polyarylene sulfides some or all of whose sulfur groups have been converted into sulfonyl groups. Oxidized polyarylene sulfides and their preparation are described, for example, in DE 43 14 737, DE 43 14 738, DE 44 40 010 and in DE 195 31 163 A1, to which reference is made. Examples of oxidized polyarylene sulfides are polyarylene sulfones, polyarylene sulfide-sulfones, polyarylene sulfoxide-sulfones and polyarylene sulfide-sulfoxide-sulfones. Particular preference is given to oxidized polyarylene sulfides in which at least 30%, preferably at least 60%, of the sulfur bridges have been converted to sulfonyl groups. Preferred polyarylene sulfones are polyphenylene sulfones, especially polyphenylene sulfones with at least 30%, preferably at least 60%, of sulfonyl groups. Oxidized polyarylene sulfides are particularly stable to heat and exhibit sufficient thermal stability under the conditions in which the coating systems are baked.

The average particle size ($d_{50}$) of the oxidized polyarylene sulfides of the invention is generally from 0.3 to 500 μm, preferably from 1 to 300 μm and, with particular preference, from 5 to 50 μm.

The proportions of polymer, binder resin and oxidized polyarylene sulfide in the polymer mixture of the coating system are in general from 1.5 to 99.5% by weight, preferably from 20 to 99% by weight and, with particular preference, from 50 to 98% by weight of polymer, from 0 to 98% by weight, preferably from 0 to 60% by weight and, with particular preference, from 0 to 40% by weight of binder resin and from 0.5 to 60% by weight, preferably from 1 to 40% by weight and, with particular preference, from 2 to 30% by weight of oxidized polyarylene sulfide, the proportions by weight of polymer, binder resin and oxidized polyarylene sulfide adding to 100% and permitting the presence of further substances.

In addition, the coating system also comprises a liquid vehicle in an amount of from 1 to 99% by weight, preferably from 20 to 80% by weight, based on the overall weight of the coating system. This liquid vehicle is preferably water, although for some applications organic solvents are also advantageous, a suitable organic solvent being in principle one whose volatility, alone or in a mixture with other solvents, including water is such that it can be removed easily during the baking operation but does not volatilize too greatly during the application procedure, and which is also inert with respect to polymers, binder resins and oxidized polyarylene sulfides.

Organic solvents which have been found particularly favorable are ethylene glycol, diethylene glycol, triethylene glycol, propylene glycol and their mono- and dialkyl ethers, preferably etherified with alkyl radicals of 1 to 6 carbon atoms. Also suitable are polar aprotic solvents, such as N-methylpyrrolidone, N,N-dimethylformamide and dimethyl sulfoxide, and also apolar solvents, such as benzene, toluene, xylene or aliphatic hydrocarbons having a boiling point of from 60 to about 350° C.

The coating systems of the invention may also comprise other constituents, such as dispersants, emulsifiers, wetting agents, buffers, heat stabilizers, UV stabilizers, antistats, flame retardants, dyes, pigments, organic and/or inorganic fillers, and also lubricant additives such as molybdenum disulfide, graphite or polytetrafluoroethylene.

The coating system of the invention can be prepared as follows:

First of all, a suspension of the constituents of the polymer mixture in the liquid vehicle is prepared. In this case it is possible first of all to prepare stock suspensions consisting in each case of only one constituent of the mixture, which are subsequently stirred together to form a suspension which then contains all of the constituents of the mixture, or else a suspension of all or of two or more constituents of the mixture is prepared directly.

The individual stock suspensions or a suspension containing all of the constituents of the mixture can advantageously be prepared by grinding in a ball mill with or without a stirrer mechanism.

The resulting suspension can be adjusted to the desired overall solids content by adding further portions of the liquid vehicle, said solids content being adapted to the respective method of application.

In the manner indicated it is also possible to prepare mixtures whose liquid vehicle consists of mixtures of water and water-miscible organic solvents.

The coating system of the invention prepared in this way can be applied to the substrate by conventional methods such as squirting, dipping, rolling, brushing or spraying. Following application, the coated substrate can be dried first of all, depending on the nature of the liquid vehicle and polymer used, and subsequently baked.

When using fluoropolymers, depending on the nature of the liquid vehicle, the drying temperature can be from 20 to 300° C. Subsequently, the coated substrate can be heated at temperatures from 200 to 450° C., preferably from 220 to 420° C., for from about 1 minute to 2 hours, in the course of which the constituents of the polymer mixture are baked and solidified.

With an appropriate composition of the polymer mixture it is also possible to use said mixture as a powder coating material and to apply it and bake it on the coating substrate without a liquid vehicle.

The coating systems used in accordance with the invention are suitable for the coating of substrate surfaces whose temperature stability is sufficiently high that they withstand the baking operation without damage. Examples of such substrates are metallic substrates, such as aluminum, steel, copper, bronze and brass, and also nonmetallic substrates, such as ceramic, porcelain or glass.

The coating systems used in accordance with the invention are suitable, for example, for the coating of cooking implements such as frying pans, saucepans and baking sheets or baking implements, or for lining ovens. In the production of coated articles it is possible to coat a workpiece or blank and then shape it, or to coat a ready-shaped implement.

In addition, the coating systems used in accordance with the invention are suitable, for example, for forming coatings on numerous other articles. Examples of these include finishes for industrial processes such as shaping, milling or rolling, sliding bearings, stirrers, mixing equipment, chutes, hoppers or containers for bulk products, and thermal welding tongs, household articles such as iron hotplates, food mixers and ice separators, and also tools such as sawblades. The coating systems used in accordance with the invention are also employed in electrical engineering in order, for example, to produce insulated wire.

EXAMPLES

The following mixtures were prepared from individual suspensions by stirring:

TABLE 1

|  | Mixture A Solids content [%] | Mixture B Solids content [%] | Mixture C Solids content [%] | Mixture D Solids content [%] | Mixture E Solids content [%] |
| --- | --- | --- | --- | --- | --- |
| PTFE (57.1% strength) | 80 | 77.5 | 75 | 70 | 60 |
| PFA (49.8% strength) |  |  |  |  |  |
| PAI (11.02% strength) | 20 | 20 | 20 | 20 | 20 |
| PPS (25% strength) |  |  |  |  |  |
| PPSO$_2$ (25% strength) |  | 2.5 | 5 | 10 | 20 |

TABLE 2

|  | Mixture F Solids content [%] | Mixture G Solids content [%] | Mixture H Solids content [%] | Mixture I Solids content [%] | Mixture J Solids content [%] |
| --- | --- | --- | --- | --- | --- |
| PTFE (57.1% strength) | 40 | 38.75 | 37.5 | 35 | 30 |
| PFA (49.8% strength) | 40 | 38.75 | 37.5 | 35 | 30 |
| PAI (11.02% strength) | 20 | 20 | 20 | 20 | 20 |
| PPS (25% strength) |  |  |  |  |  |
| PPSO$_2$ (25% strength) |  | 2.5 | 5 | 10 | 20 |

TABLE 3

|  | Mixture K Solids content [%] | Mixture L Solids content [%] | Mixture M Solids content [%] | Mixture N Solids content [%] | Mixture O Solids content [%] |
|---|---|---|---|---|---|
| PTFE (57.1% strength) | 40 | 38.75 | 37.5 | 35 | 30 |
| PFA (49.8% strength) | 40 | 38.75 | 37.5 | 35 | 30 |
| PAI (11.02% strength) | 10 | 10 | 10 | 10 | 10 |
| PPS (25% strength) | 10 | 10 | 10 | 10 | 10 |
| PPSO$_2$ (25% strength) |  | 2.5 | 5 | 10 | 20 |

The percentage in brackets after the individual constituents of each mixture indicates the solids content of the respective suspension. For example, PTFE (57.1%) describes a suspension having a PTFE content of 57.1% by weight. The suspension medium (liquid vehicle) used was water.

The PTFE (polytetrafluoroethylene) used was Hostaflon TF 5035 from Dyneon GmbH, Burgkirchen, FR Germany. Product properties are documented in the data sheet "Hostaflon" from Dyneon GmbH.

The PFA (perfluoroalkoxy) used was Hostaflon PFA 6900 from Dyneon GmbH, Burgkirchen, FR Germany. Product properties are documented in the data sheet "Hostaflon" from Dyneon GmbH.

The PAI (binder resin) used was BH 9000, a polyamide-imide from Vianova Resins GmbH, Mainz-Kastel, FR Germany. Product properties are documented in the product catalog from Vianova Resins GmbH.

The PPS (binder resin) used was Fortron 0205 B4/20 from Ticona GmbH, Frankfurt a.M., FR Germany. Product properties are documented in the data sheet "Fortron" from Ticona GmbH.

PPSO$_2$ (polyphenylene sulfone) was prepared as follows:

63 kg of polyphenylene sulfide powder ($d_{50}$: 20 μm) having a $T_g$ of 94° C. and a $T_m$ of 290° C. were introduced as initial charge into 219 l of glacial acetic acid at 50° C., 1.2 l of concentrated sulfuric acid were added, and 91 kg of hydrogen peroxide (50%) were added dropwise over 3 h, during which the temperature rose to 60–65° C. After a period of subsequent stirring of 2 h at 65° C. and 1 h at 80° C. the reaction solution was cooled and filtered with suction at 50° C. and the solid product was washed with water and dried. Yield: 70 kg; DSC data: $T_g$: 352° C., $T_m$: 520° C. (decomposition); elemental analysis: $(C_6H_4SO_2)_n$—C:55.6%, H:3.2%, S:24.6%, O:16.0%. This corresponds to a degree of oxidation of about 65% based on the sulfur content of the polymer.

The resulting mixtures were ground in a ball mill for 18 h and then applied to degreased aluminum panels (100× 100×1 mm) by means of a spray gun. The coatings were dried at 90° C. for 15 minutes and then baked at 250° C. for 15 min and at 400° C. for 15 minutes.

The following investigations were carried out on the coated substrates:

The adhesion was determined in accordance with DIN 53 151 (crosshatch test).

In the water boiling test, the coated substrate was boiled for 4 h in boiling water. The adhesion was subsequently determined in accordance with DIN 53 151.

In the case of the salt water boiling test, the coated substrate was boiled for 3 h in boiling salt water. The adhesion was then determined in accordance with DIN 53 151.

In the oil boiling test, the coated substrate was boiled for 3 h in edible oil at 180° C. The adhesion was then determined in accordance with DIN 53 151. The pendulum hardness was determined in accordance with DIN 53 157.

The Erichsen indentation was determined in accordance with DIN 53 156.

The abrasion was determined as follows: a pendulum with a Scotch-guard brand household sponge at its end swings back and forward, the rough end of the sponge rubbing the surface of the substrate with each swing of the pendulum. The number of cycles is 1000.

TABLE 4

| Test | Unit | Mixture A | Mixture B | Mixture C | Mixture D | Mixture E |
|---|---|---|---|---|---|---|
| Coat thickness, minimum | μm | 20 | 19 | 15 | 20 | 20 |
| Coat thickness, maximum | μm | 75 | 72 | 67 | 74 | 73 |
| Adhesion | Points | GT 0 | GT 0 | GT 0 | GT 0 | GT 0 |
| Adhesion after water boiling test | Points | GT 0 | GT 0 | GT 0 | GT 0 | GT 0 |
| Adhesion after salt water boiling test | Points | GT 1 | GT 0 | GT 0 | GT 0 | GT 0 |
| Adhesion after oil boiling test | Points | GT 1 | GT 0 | GT 0 | GT 0 | GT 0 |
| Pendulum hardness | Points | 47 | 51 | 55 | 60 | 65 |
| Erichsen indentation | mm | 10 | 10 | 10 | 10 | 10 |
| Abrasion | mg | 20 | 12 | 8 | 5 | 3 |

TABLE 5

| Test | Unit | Mixture F | Mixture G | Mixture H | Mixture I | Mixture J |
|---|---|---|---|---|---|---|
| Coat thickness, minimum | μm | 21 | 21 | 17 | 23 | 19 |
| Coat thickness, maximum | μm | 73 | 70 | 69 | 72 | 73 |
| Adhesion | Points | GT 0 | GT 0 | GT 0 | GT 0 | GT 0 |

TABLE 5-continued

| Test | Unit | Mixture F | Mixture G | Mixture H | Mixture I | Mixture J |
|---|---|---|---|---|---|---|
| Adhesion after water boiling test | Points | GT 0 | GT 0 | GT 0 | GT 0 | GT 0 |
| Adhesion after salt water boiling test | Points | GT 1 | GT 0 | GT 0 | GT 0 | GT 0 |
| Adhesion after oil boiling test | Points | GT 1 | GT 0 | GT 0 | GT 0 | GT 0 |
| Pendulum hardness | Points | 57 | 61 | 65 | 69 | 72 |
| Erichsen indentation | mm | 5 | 5 | 5 | 5 | 5 |
| Abrasion | mg | 19 | 10 | 7 | 3 | 1 |

TABLE 6

| Test | Unit | Mixture K | Mixture L | Mixture M | Mixture N | Mixture O |
|---|---|---|---|---|---|---|
| Coat thickness, minimum | μm | 19 | 18 | 17 | 21 | 19 |
| Coat thickness, maximum | μm | 71 | 75 | 74 | 74 | 72 |
| Adhesion | Points | GT 0 | GT 0 | GT 0 | GT 0 | GT 0 |
| Adhesion after water boiling test | Points | GT 0 | GT 0 | GT 0 | GT 0 | GT 0 |
| Adhesion after salt water boiling test | Points | GT 0 | GT 0 | GT 0 | GT 0 | GT 0 |
| Adhesion after oil boiling test | Points | GT 0 | GT 0 | GT 0 | GT 0 | GT 0 |
| Pendulum | Points | 56 | 60 | 66 | 68 | 71 |
| Erichsen indentation | mm | 5 | 5 | 5 | 5 | 5 |
| Abrasion | mg | 20 | 13 | 7 | 4 | 2 |

What is claimed is:

1. A polymeric coating system consisting of a suspension of a polymer mixture which comprises at least one oxidized polyarylene sulfide in a liquid vehicle having a boiling point of from 60 to 350° C.

2. The polymeric coating system as claimed in claim 1, wherein the polymer mixture comprises from 1.5 to 99.5% by weight of polymer, from 0 to 98% by weight of binder resin and from 0.5 to 60% by weight of oxidized polyarylene sulfide.

3. The polymeric coating system as claimed in claim 1, wherein the polymer mixture comprises from 20 to 99% by weight of polymer, from 0 to 60% by weight of binder resin and from 1 to 40% by weight of oxidized polyarylene sulfide.

4. The polymeric coating system as claimed in claim 2, wherein the polymer is an organic fluoropolymer or a silicone and the binder resin is a polyphenylene sulfide, polyaryl ether ketone, polyamideimide, polyimide or polyether sulfone.

5. The polymeric coating system as claimed in claim 1, wherein the proportion of the overall weight of the coating system accounted for by the liquid vehicle is from 1 to 99% by weight.

6. The polymeric coating system as claimed in claim 1, wherein the liquid vehicle is selected from the group consisting of water, ethylene glycol, diethylene glycol, triethylene glycol, propylene glycol, a mono- or dialkyl ether of ethylene glycol, diethylene glycol, triethylene glycol or propylene glycol with alkyl radicals of 1 to 6 carbon atoms, N-methylpyrrolidone, N,N-dimethylformamide, dimethyl sulfoxide, benzene, toluene, xylene and aliphatic hydrocarbons.

7. The polymeric coating system as claimed in claim 1, wherein the oxidized polyarylene sulfide is selected from the group consisting of a linear or branched polyarylene sulfone, polyarylene sulfide-sulfone, polyarylene sulfoxide-sulfone and polyarylene sulfide-sulfoxide-sulfone.

8. The polymeric coating system as claimed in claim 1 and a molding with the system coated onto the molding.

9. The polymeric coating system as claimed in claim 1 and a substrate selected from the group consisting of aluminum, steel, copper, bronze, brass, ceramic, porcelain and glass with the system coated onto the substrate.

* * * * *